Sept. 18, 1951      C. S. SMITH      2,568,094

METHOD AND APPARATUS FOR FORMING FILLED CAPSULES

Filed Nov. 12, 1947      2 Sheets-Sheet 1

INVENTOR.
Carl S. Smith,
BY
Wilkinson, Huxley, Byron & Hume
Attys.

Sept. 18, 1951           C. S. SMITH           2,568,094
METHOD AND APPARATUS FOR FORMING FILLED CAPSULES
Filed Nov. 12, 1947           2 Sheets-Sheet 2
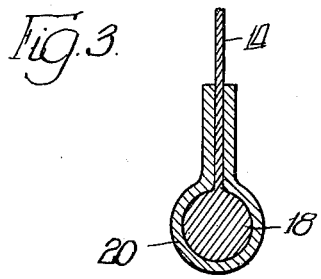
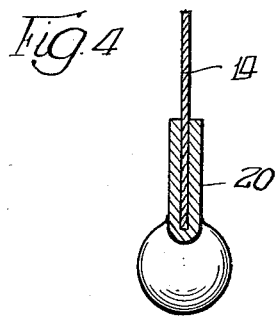
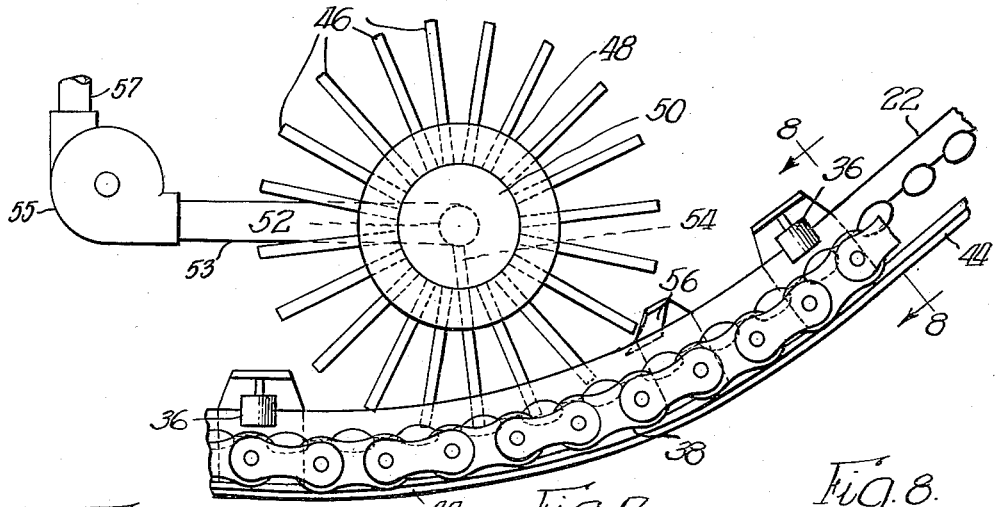
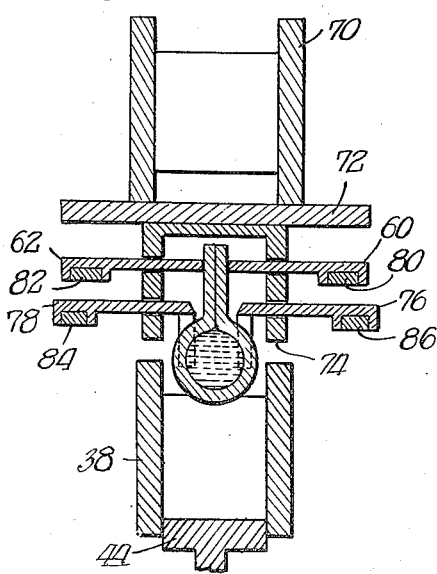
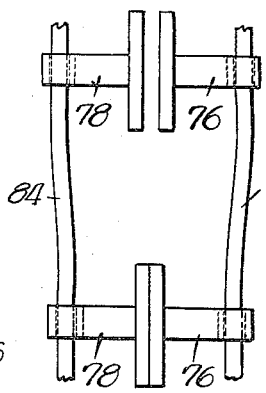
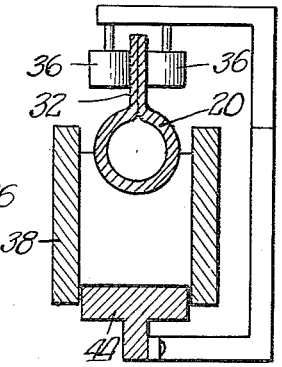
INVENTOR.
Carl S. Smith.
BY Wilkinson, Huxley, Byron & Hume
ATTYS.

Patented Sept. 18, 1951

2,568,094

UNITED STATES PATENT OFFICE 2,568,094

METHOD AND APPARATUS FOR FORMING FILLED CAPSULES

Carl S. Smith, Flossmoor, Ill.

Application November 12, 1947, Serial No. 785,399

11 Claims. (Cl. 18—1)

This invention relates to a method and apparatus for making filled capsules. More particularly, it relates to an improved method of and mechanism for forming a longitudinally folded strip of suitable plastic material having cavities therein opening within the fold, filling said cavities with a desired fluid substance, and sealing and cutting the same from said strip, the resulting product being in the form of sealed capsules.

Various methods have been developed in the past for manufacturing capsules containing fluid substances. The method which has been most successful commercially involves the use of two opposed rotatable die rolls having a multiplicity of successively registering die cavities surrounded by sealing and severing ledges, and two strips of gelatin film which are continuously fed between the two die rolls. The fluid to be encapsulated is forced under pressure against these juxtaposed gelatin films and the fluid pressure causes the film to expand into the mold cavities to form two substantially hemispherical shells. Thereafter the ledges surrounding the die cavities operate to force the contiguous portions of the gelatin shells into sealing contact and thereby forming a closed capsule around the fluid filling. This basic method has been improved and modified in some respects from time to time, such as through the use of a vacuum to aid in the formation of the hemispherical shells.

Two other general methods of forming filled capsules have been developed. One of these latter methods involves the formation by one of several possible means of a continuous gelatin tube, subsequent deformations of the tube by means of a vacuum or fluid pressure to form the capsules, and then severing the capsule from the tube. The other general method involves the use of a composite drop containing the liquid to be encapsulated surrounded by the encapsulating substance in a liquid state, the drop being formed by extrusion of the two liquids through concentric orifices. This composite drop is then passed through a suitable liquid cooling medium to solidify the encapsulating material.

There are a number of disadvantages inherent in all of these methods. The first mentioned method requires equipment which is highly complicated and difficult both to produce and to maintain, which results in high initial and maintenance expense. Also, since the internal volume of the capsules produced by the first mentioned method is affected by the thickness of the two gelatin films from which the capsule is made, there is inherent danger of variation in their fluid content. Reducing fluctuations in the thickness of the gelatin films to an insignificant point can only be accomplished with great difficulty and added expense. Also, in the process of forming the capsules the gelatin sheets are necessarily stretched and although they are maintained at a temperature during the stretching operation which keeps them relatively soft and pliable, the stretching causes occasional rupture and produces other imperfections in the final product, such as lopsidedness. In addition, a serious limitation of such a method is that each machine can produce only one form and size of capsule and because of the high initial cost of the units this precludes much flexibility insofar as the type of product which may be produced is concerned.

The method utilizing a continuous gelatin tube requires the formation of that tube together with its nearly simultaneous deformation into capsules. This does not give the encapsulating material sufficient time to jell satisfactorily and the resultant lack of physical strength must of necessity cause a high percentage of the capsules produced to be imperfect. Also, the use of a tube of gelatin introduces a large amount of sliding friction between the gelatin which moves through an annular space, and the stationary parts of the apparatus which confine the gelatin tube. This friction must be balanced with the exact pressure required to force the solidifying gelatin through the annular space at a carefully controlled rate. Failure to do this will cause the gelatin tube to be in improper condition to be formed into capsules. In practice it is extremely difficult to achieve and maintain for prolonged periods the precise degree of control which is thus required and this further contributes to the formation of imperfect capsules.

The method utilizing the composite drops is theoretically a very desirable one in that a seamless capsule is produced, and the equipment that would seem to be required is relatively simple. However, it is evident that well formed capsules containing accurate amounts of liquid can be produced only if the viscosity and the surface tension of both the gelatin and the liquid to be encapsulated are maintained within very close limits. This is practically an impossibility with respect to the gelatin because gelatin is not a very homogeneous substance and the particular physical properties in question, that is, surface tension and viscosity, will vary significantly from batch to batch.

In the light of these disadvantages inherent in the methods previously utilized, applicant has developed a method and apparatus which operates on a completely different principle. It is therefore not subject to the objections discussed above.

It is therefore an object of this invention to provide a method and apparatus for making filled capsules which will produce continuously well shaped and securely sealed capsules containing accurate amounts of encapsulated substance.

It is a further object of this invention to provide a method and apparatus of the character described which has a relatively high degree of flexibility with regard to the size and shape of the product.

It is also an object of this invention to provide an apparatus of the character described which is continuous and automatic in its operation and which requires a minimum of maintenance; which may be readily cleaned and maintained in a sanitary condition; which is relatively inexpensive to produce; and which reduces wastage to a minimum.

Further objects and advantages of this invention will become evident as the description proceeds, and from an examination of the accompanying drawing which illustrates one embodiment of the invention and in which similar numerals refer to similar parts throughout the several views.

Fig. 3 is a vertical cross sectional view of a portion of the peripheral edge of the casting disc shown in Fig. 2, the view being taken along the line 3—3.

Fig. 4 is a vertical cross sectional view similar to Fig. 3, the view being taken along the line 4—4 of Fig. 2.

Fig. 5 is an enlarged fragmentary view of a portion of the mechanism shown in Fig. 1, showing the radially mounted conduits and the conveyor chain upon which the folded strip of plastic material moves, in more detail.

Fig. 6 is an enlarged vertical cross sectional view of a portion of the cutting mechanism, the view being taken along the line 6—6 of Fig. 1.

Fig. 7 is a plan view, partly in cross section, of the cutting dies and the guide rails upon which these dies move.

Fig. 8 is a vertical cross sectional view, the view being taken along the line 8—8 of Fig. 5, of a portion of the conveyor and the folded strip of plastic material showing the guide rolls for the strip of plastic material and the support and guide for the chain conveyor.

Figure 1:
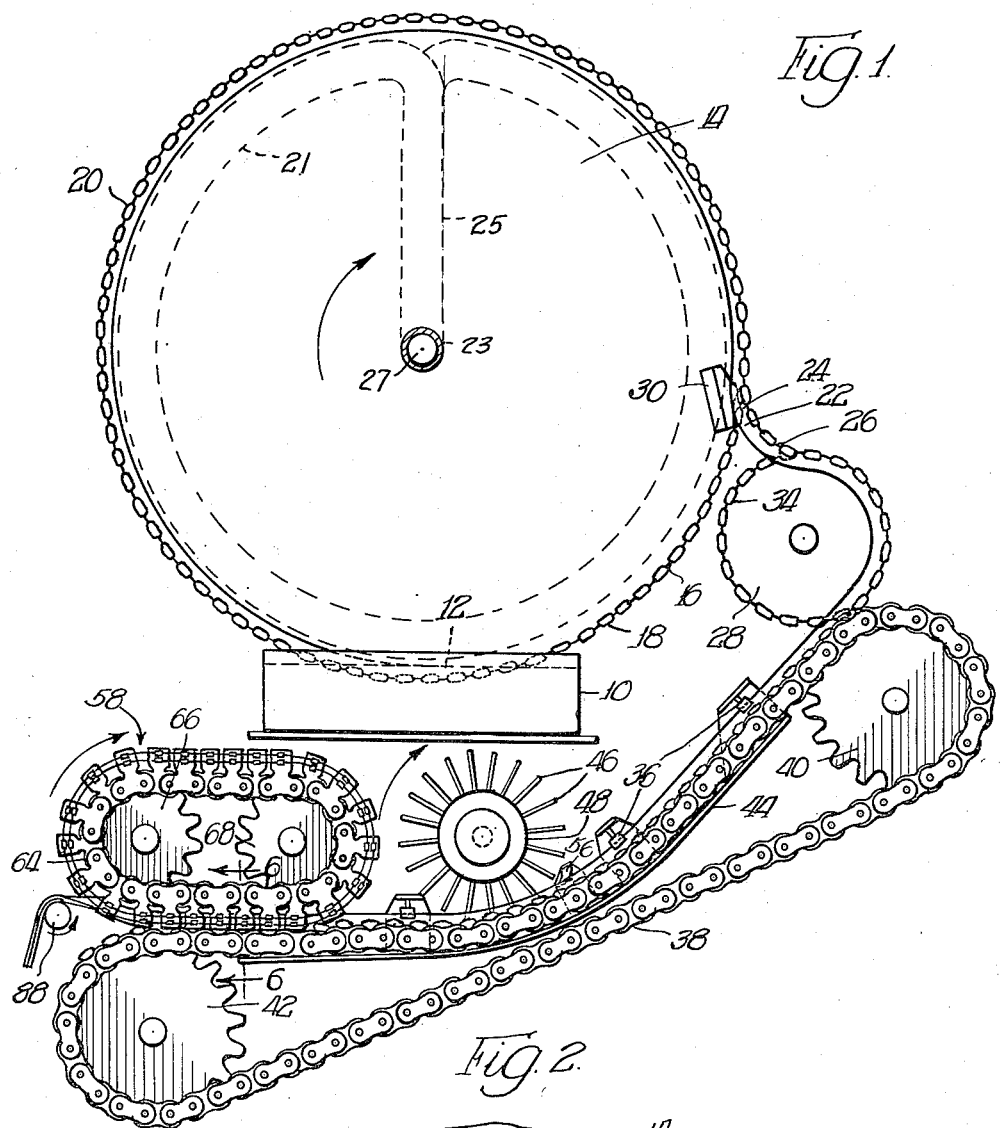
Fig. 1 is a somewhat diagrammatic side elevation of one embodiment of the invention showing the sequence of operation from the bath of liquefied plastic material to the discharge of the finished capsules.

Referring now more specifically to Fig. 1, in which one embodiment of the invention is somewhat diagrammatically shown, the apparatus includes a bath 10 of suitable encapsulating material 12, such as liquefied gelatin, and a casting disc 14 rotatably disposed so that its peripheral edge 16 dips continuously into the bath of gelatin. The gelatin 12 in the bath 10 is maintained at a constant level and temperature by suitable means, not shown, and the depth to which the peripheral edge 16 is continuously submerged in the gelatin is therefore also constant.

Figure 2:
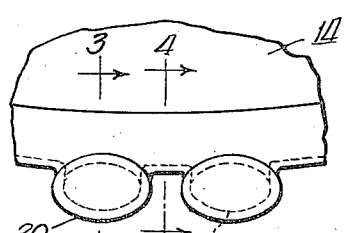
Fig. 2 is an enlarged fragmentary view of a portion of the peripheral edge of the casting disc shown in Fig. 1.

The peripheral edge of the casting disc 14 has a plurality of equally spaced nodular molds 18 protruding therefrom as best shown in Figures 2 and 3. Suitable means may be provided for cooling the casting disc 14 to a temperature such that when its peripheral edge 16 is passed through the gelatin 12 in the bath 10 a film 20 of gelatin is formed thereon. This cooling means may be in the form of a blower adapted to blow cooled air onto the peripheral edge 16 of the disc at a point adjacent to that point at which it enters the bath 10, and also at a point adjacent to the point at which it leaves the bath 10. On the other hand, the whole disc 14 might be cooled by circulating a refrigerant therethrough. In Figure 1, disc 14 is shown provided with a circular passage 21 which communicates with the hollow shaft 23, so that a refrigerant may be circulated through the passage 21 to cool the peripheral edge 16 of the casting disc 14. The input side 25 of the passage 21 may communicate with one side of the hollow shaft 23, and the output passage (not shown) of the passage 21 may communicate with the opposite side of the hollow shaft 23, and the two sides of the shaft 23 may be divided by a suitable partition 27. In any event, because of the temperature differential maintained between the liquified gelatin 12 and the peripheral edge 16 of the casting disc, the film 20 is formed thereon as the disc 14 is rotated through the gelatin. This film 20 is congealed sufficiently by the time the wheel has made approximately a three-quarter turn so that it may be removed from the disc 14 in the form of a folded ribbon of gelatin 22 having hollow nodules 24 protruding from the folded edge 26 thereof. The form of this ribbon when it is deposited on the disc 14 is well illustrated by the sectional views in Figures 3 and 4, and it is of sufficient strength when cooled, as above described, to maintain substantially this same shape after it is removed from the disc 14.

When the encapsulating material used is gelatin a plasticiser such as glycerin may be added to the gelatin solution to give the finished capsule a greater toughness. The exact proportion of the ingredients may be varied depending on the viscosity of the gelatin, the desired thickness of the film and other like factors.

Prior to being submerged in the gelatin solution the peripheral edge of the casting disc may also be sprayed lightly with a fine mist of mineral oil to aid in preventing the ribbon 22 from sticking to the casting disc at the time it is removed therefrom. The thickness of the film formed on the casting disc is largely dependent upon temperature of the disc, the speed of rotation of the disc, the temperature of the bath of encapsulating material and the physical characteristics of that material. If these factors are held constant the thickness of the film 20 will, in turn, be substantially constant which is of course a desirable feature. In connection with the constant thickness of the film it should be pointed out that the necessity of maintaining this as constant as possible is not as great when utilizing the method of forming the capsules which is the subject matter of this invention as it is when the currently employed methods described above are utilized. This is true since the internal volume of the capsules formed by the apparatus which embodies this invention is not a function of the thickness of the walls of the capsule as is the case in the previously used methods since the molds 18 are used to form the capsules and the internal volume of the latter is therefore fixed by the dimensions of these molds.

The ribbon 22 is removed from the casting disc 14 by the action of the stripping disc 28 which is of the same construction as casting disc 14 except that it is of considerably smaller diameter. The stripping guides 30 are also disposed so as to aid in removing the ribbon 22 from the disc 14 and serve to lift the flange portions 32 of the ribbon 22 from the disc 14 and direct the ribbon toward the stripping disc 28. The disc 28 is adapted to have the ribbon passed on to its peripheral edge so that it is carried in substantially the same fashion as it was by the disc 14. By driving the stripping disc slightly ahead of the casting disc, and by disposing the two discs in spaced relation, as shown in Figure 1, suitable tension is maintained on the ribbon 22 which, coupled with the action of the guides 30, serves to cause the ribbon 22 to be passed from the disc 14 to the disc 28 without difficulty. The nodular molds 34 on the stripping disc 28 are adapted to be received by the hollow nodules 24 in the ribbon 22 and when so received the ribbon will tend to cling to the peripheral edge of the stripping disc 28. However, as the ribbon passes to the lower portion of the disc 28 its weight causes it to drop free from the disc onto a suitable conveyor chain 38. The ribbon 22 is now in an inverted position as it leaves the stripping disc 28 and the flange portions 32 of the strip are therefore uppermost.

The conveyor chain 38 is so disposed on the sprocket wheels 40 and 42 that the ribbon 22 is adapted to come into contact therewith as it leaves the stripping disc 28. The conveyor chain 38 is driven in synchronization with the movement of the ribbon 22 imparted to it by the discs 14 and 28 so that each hollow nodule 24 protruding from the folded edge of the strip 26 is carried midway between the two ends of one link of the chain, the links having the same spacing as the molds 18 on the peripheral edge 16 of the casting disc 14. The conveyor chain itself is supported by the track 44 which is best shown in Figures 5 and 8. This track serves to guide the upper flight of the conveyor chain 38 in the arcuate path shown in Fig. 1. The chain may be sprayed lightly with a neutral mineral oil to preclude any undesirable adhesion of the encapsulating material in the same fashion as the casting disc 14 mentioned above.

As shown in Fig. 1, after the ribbon is disposed thereon as described, the conveyor chain 38 passes immediately below the radially disposed conduits 46 extending outwardly from the hub 48. The hub 48 is rotatably mounted on a stationary shaft 50 having the longitudinal bore 52 therein with which the radial bore 54 communicates. The conduits 46 extend through the hub 48 and terminate at the surface of the shaft 50. The bore 54 is so aligned with the hub 48 that as the latter is rotated each of the conduits 46 may be brought into alignment with it. As the ribbon is passed beneath the conduits 46, the two flanges 32 of the ribbon are momentarily separated by the spreader 56 which is immediately adjacent the point at which the path of the conduits intersects the path of the flanges 32 of the ribbon. By proper alignment of the conveyor chain 38 the conduits 46 may be caused to pass between the flanges 32 immediately after the latter have been separated by the spreader 56. Since the conduits 46 at their outer extremities are separated by a distance equal to the distance between the center point of adjacent hollow nodules 24 the hub 48 may be made to rotate in a manner which will cause successive conduits 46 to pass into communication with the hollow center of successive nodules. By proper disposal of the conveyor chain 38, which is governed in turn by the disposition of the track 44, the conduits may be caused to be gradually inserted into the hollow portions of the nodules as the hub 48 is rotated until they are immediately adjacent the bottom of the nodule. In other words, the lowest point in the path of the conduits is made to substantially coincide with the bottom of the hollow portion of the nodules 24. Such an arrangement causes the nodules to fill from the bottom when the filling liquid is passed through the conduits 46 thus causing all the air which the hollow nodules retain to be pushed out through the gap maintained between the flanges 32 of the ribbon by the presence of the conduits 46. The inclusion of any air in the sealed capsule is therefore avoided.

The bore 54 in the shaft 50 is also so aligned that it comes into registry with each conduit 46 substantially at the moment when the latter's outer extremity is at its lowest point of travel. The bore 52 with which the bore 54 communicates is itself in communication with the conduit 53 which in turn communicates with a liquid metering pump 55, shown in Figure 5, which may be of standard construction and which is adapted to force a predetermined, accurately measured amount of the desired filling liquid through each conduit at the precise moment when it is aligned with the bore 54. The metering pump 55 may in turn be in communication with a suitable reservoir (not shown) of the filling liquid through the conduit 57. Since the internal volume of each module is the same, as explained above, the metering pump may be adjusted to pass the amount of filling liquid necessary to fill this volume. Then as the ribbon 22 is moved away from the conduits 46, and the latter are rotated in synchronization with this movement, each conduit is gradually withdrawn from within the filled nodule and is separated entirely from the ribbon 22. As the conduits 46 are removed from between the flanges 32 of the ribbon these flanges have a natural tendency to come together which automatically tends to seal the opening in the nodules 24 through which the conduits were previously inserted into the interior of the nodules.

When the flanges 32 have thus again been brought together and the nodules have been filled as described, the ribbon is passed along by the conveyor chain 38 into communication with the sealing and cutting mechanism indicated generally by the numeral 58 in Fig. 1. A guide roll 36 between the point at which the conduits are withdrawn from the ribbon 22 and the point at which the latter comes into contact with the sealing and cutting mechanism 58 insures that the flanges 32 are pressed firmly together prior to being clamped by the holding bars 60 and 62, shown in Fig. 6. These holding bars are adapted to be clamped against the upstanding flanges 32 as the ribbon is passed into association with the sealing and cutting mechanism 58. This mechanism may be formed of a roller chain 64, similar to the conveyor chain 38, and the sprocket wheels 66 and 68 over which the chain 64 runs. Each of the links 70, as shown in Fig. 6, has a plate 72 secured thereto opposite to the side of the link through which the teeth of the two sprocket wheels are adapted to enter. Secured to each of these plates 72 are the supporting frames 74 of U-shaped cross section which are adapted to support the holding bars 60 and 62 and the dies 76 and 78. The holding bars and the dies are adapted to be moved inwardly or outwardly in the frames 74 which movement is controlled by the guide rails 80, 82, 84 and 86. The sliding elements are arranged to move in cooperative engagement at their extremities with these guide rails, as shown in Figs. 6 and 7, and the rails are so disposed that they cause these elements to open or close at appropriate times. The holding bars for instance are adapted to be moved into clamping relation with the upstanding flanges 32 of the ribbon as it moves into association with the sealing and cutting means 58, to accurately center and secure the ribbon during the sealing and cutting operation, for which the dies 76 and 78 are employed. These members are adapted to cooperate with the guide rails 84 and 86 in substantially the same fashion as the holding bars cooperate with their guide rails, and have an arcuate cutting edge conforming to the shape of the opening in the nodules within the fold of the ribbon 22.

It has been found to be desirable to have the dies 76 and 78 heated in some fashion immediately prior to their closing on the flanges 32 so that the plastic material making up the ribbon 22 will not only be pressed together by the dies to seal and sever the capsules, but will at the same time be slightly plasticized to increase the security of the seal. The seal can be accomplished by the use of unheated dies but more reliable results may be obtained if they are heated. The temperature of the dies must be carefully controlled, however, since overheating will cause an excessive melting of the plastic material which may result in the production of defective capsules. The most satisfactory method of heating would no doubt utilize an electric current but such a method and mechanism is not the subject matter of this invention.

In accordance with what has been said previously, it may also be desirable to spray the dies with a suitable oil to prevent adhesion of the encapsulating material thereto. It may also be found desirable to employ a hot water or steam spray or the like to continuously clean the dies immediately after they have sealed and cut the capsules.

As the finished, sealed capsules are cut from the ribbon 22 they remain on the conveyor chain 38 until the latter passes around the sprocket wheel 42. As the finished capsules fall from the conveyor chain they may be deposited in any suitable container. The unused portion of the ribbon of encapsulating material is released by the holding bars 60 and 62 after the capsules have been cut therefrom and is passed over the roller 88 and may then be returned for reworking if desired.

It is obvious that the movement of the sealing and cutting mechanism 58 must also be synchronized with the movement of the conveyor chain 38, and the cutting and sealing dies must be so disposed that they are correctly aligned with the upper edges of the nodules 24 as the ribbon 22 is passed into association with the holding bars. Thus all of the moving parts of the complete device must be synchronized one with the other, as has previously been pointed out. This synchronization can probably be best accomplished by driving all parts from a common shaft from which the power transmission is by means of a chain and sprocket arrangement so that the speed ratios desired may be definitely maintained. In addition, it might be advisable to provide for minor adjustments of position for each element of the complete device so that compensations may be made for any variations induced by wear, or the like. For instance, the entire sealing assembly could be mounted on an adjustable base which could be moved along the line of movement of the conveyor chain 38. The sealing dies could then be maintained in accurate synchronization with the conveyor chain and the ribbon 22 so that the dies would precisely coincide with the capsule bodies as they move into the lower horizontal run.

From the above description it will be seen that the mechanism for producing the capsules is relatively simple and that the capsule formation does not depend on any of the poorly defined physical properties of the encapsulating material, such as surface tension, elastic strength or the like, which can be closely controlled only with the greatest difficulty when the encapsulating material is gelatin. The inner volume of the capsules is also an independent and constant factor and is unaffected by variations in the thickness of the film or the external shape of the capsule. The filling operation is accurate and successfully excludes all air from the finished capsules. In addition, the sealing operation is simple and positive and is performed in a manner which makes it subject to visual inspection and easy adjustment if required.

Furthermore, capsules of varying sizes and shapes may be readily made by substituting casting and stripping discs with varying sizes and shapes of molds, and at the same time changing the sealing assembly as a unit to correspond with the changes made in the casting and stripping discs.

The drawing and the above description are not intended to represent the only possible form of this invention, in regard to details of construction. Changes in form and in the proportion of parts, as well as the substitution of equivalents are contemplated, as circumstances may suggest or render expedient, without departing from the spirit or scope of this invention.

What is claimed:

1. A method of making filled capsules comprising the steps of forming a suitable encapsulating material into a longitudinally folded strip having relatively rigid hollow nodules of substantially fixed internal volume in the folded edge thereof, depositing sufficient fluid filling material within said hollow nodules to displace all the air therein, sealing the sides of said folded strip together adjacent the edges of said filled nodules, and cutting said sealed nodules from said strip.

2. A method of making filled capsules comprising the steps of forming a suitable encapsulating material into a longitudinally folded strip having relatively rigid hollow nodules of substantially fixed internal volume protruding from the folded edge thereof and opening within the fold of said strip, depositing sufficient fluid filling material within said hollow nodules to displace all the air therein, and sealing the sides of said folded strip together adjacent the edges of said filled nodules.

3. A method of making filled capsules comprising the steps of forming a suitable encapsulating material into a longitudinally folded strip having relatively rigid hollow nodules of substantially fixed internal volume in the folded edge thereof, depositing sufficient fluid filling material within said hollow nodules to displace all the air therein, sealing the sides of said folded strip together adjacent the edges of said filled nodules, cutting said sealed nodules from said strip, and reclaiming the encapsulating material in the portion of said strip remaining after said sealed nodules are cut therefrom.

4. A method of making filled capsules comprising the steps of forming a suitable encapsulating material into a longitudinally folded strip having relatively rigid hollow nodules of substantially fixed internal volume in the folded edge thereof, depositing sufficient fluid filling material within said hollow nodules to displace all the air therein, and sealing the open edges of said nodules so filled.

5. A method of making filled capsules comprising the steps of forming a suitable encapsulating material into a longitudinally folded strip having relatively rigid hollow nodules of substantially fixed internal volume in the folded edge thereof opening within the fold of said strip, depositing sufficient fluid filling material within said nodules through the opening in each nodule to displace all the air therein while maintaining said strip in a substantially horizontal position with the open edges of said nodules uppermost.

6. An apparatus for making filled capsules, comprising means for forming a continuous longitudinally folded strip of suitable encapsulating material, said strip having relatively rigid hollow nodules of substantially fixed internal volume protruding at spaced intervals from the folded edge of said strip and opening within the fold of said strip, means for filling each of said nodules with a predetermined amount of a desired fluid substance and means for sealing the edges of the openings in each nodule so filled.

7. An apparatus for making filled capsules, comprising means for forming a longitudinally folded strip of relatively rigid encapsulating material having cavities of substantially fixed internal volume therein at the folded edge, said cavities opening within the fold, a plurality of conduits adapted to be inserted one at a time into the fold and moved into communication with said cavities, means for passing a predetermined amount of a desired fluid substance to said conduits into said cavities, and means for sealing the edges of the openings in said cavities.

8. An apparatus for making filled capsules, comprising a constant level bath of suitable liquified encapsulating material, a rotatable casting disc disposed so that its peripheral edge dips below the surface of said encapsulating material as said disc is rotated, means for maintaining said peripheral edge of said disc at a temperature such that a film of said encapsulating material is deposited thereon, means for removing said film from said casting disc, said edge of said disc having a form such that said film when so removed is in the form of a longitudinally folded strip having a plurality of hollow nodules protruding from the folded edge thereof, means for filling said nodules with a desired fluid substance, means for sealing the sides of said strip together at the edges of said filled nodules, and means for cutting said sealed nodules from said strip.

9. In an apparatus for making filled capsules of the character described, a constant level bath of liquified encapsulating material, and a rotatable casting disc adapted to cooperate with said bath of material to form a film of said material embracing the peripheral edge of said casting disc, a plurality of molds in the form of convex bodies disposed in overlapping relation with, and at spaced intervals on, said peripheral edge of said casting disc and means for removing said film from said casting disc, the disposition of said molds being such that said film when so removed is in the form of a longitudinally folded strip having a plurality of spaced hollow nodules protruding in part from the folded edge of said strip and opening within the fold.

10. In an apparatus for making filled capsules having casting means for forming a continuous longitudinally folded strip of suitable encapsulating material having cavities therein at the folded edge opening within the fold, a plurality of conduits radially disposed about a hub member, means for conveying said strip into association with said conduits, means for rotating said conduits about said hub member in synchronization with the movement of said conveying means so that each conduit is inserted successively into the fold and moved into communication with one of said cavities in said strip for a short period, means for passing a predetermined amount of a desired fluid substance through said conduits into said cavities when said conduits are in communication with said cavities, means for sealing the edges of the openings of said cavities, and means for cutting said sealed cavities from said strip.

11. In an apparatus for making filled capsules, means for forming a longitudinally folded strip of suitable encapsulating material having cavities therein at the folded edge opening within the fold, comprising a rotatable disc, a plurality of substantially ellipsoidal molds carried by and protruding from the peripheral edge of said disc, said molds being disposed so that their longitudinal axes are in spaced relation and substantially parallel to said peripheral edge of said disc and means for continuously coating said peripheral edge of said disc with a solidified film of said encapsulating material.

CARL S. SMITH.

REFERENCES CITED

The following references are of record in the file of this patent:

UNITED STATES PATENTS

| Number | Name | Date |
|---|---|---|
| 1,365,528 | Mitzel | Jan. 11, 1921 |
| 2,055,292 | Hiers | Sept. 22, 1936 |
| 2,287,087 | Clausen et al. | June 23, 1942 |
| 2,288,327 | Scherer | June 30, 1942 |
| 2,390,071 | Barnett | Dec. 4, 1945 |